June 22, 1965

E. C. JUNGE 3,190,676

SCOOTER TYPE VEHICLE

Filed Sept. 29, 1961

INVENTOR
EDWARD C. JUNGE

BY

*Wright and Wright*

ATTORNEYS

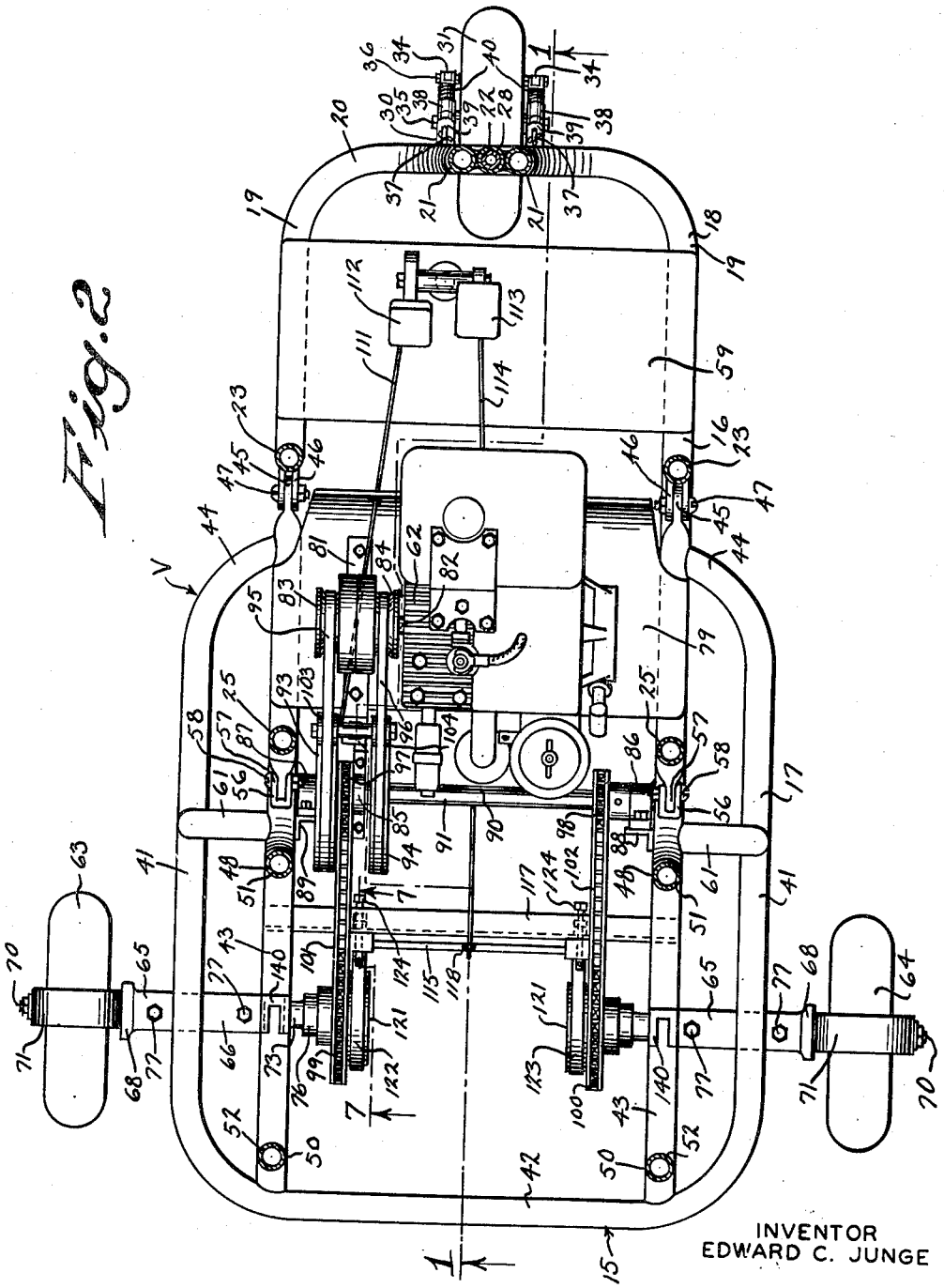

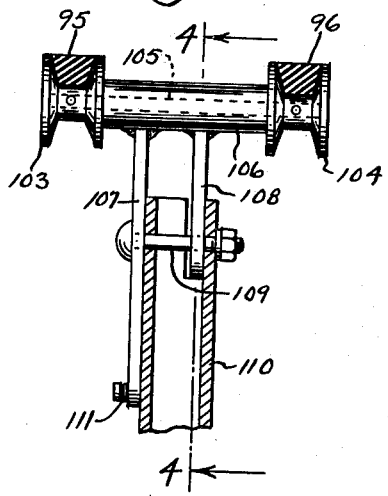
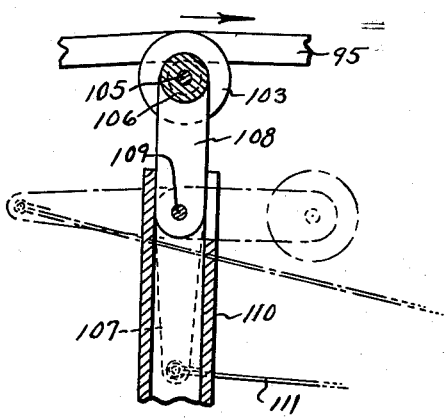
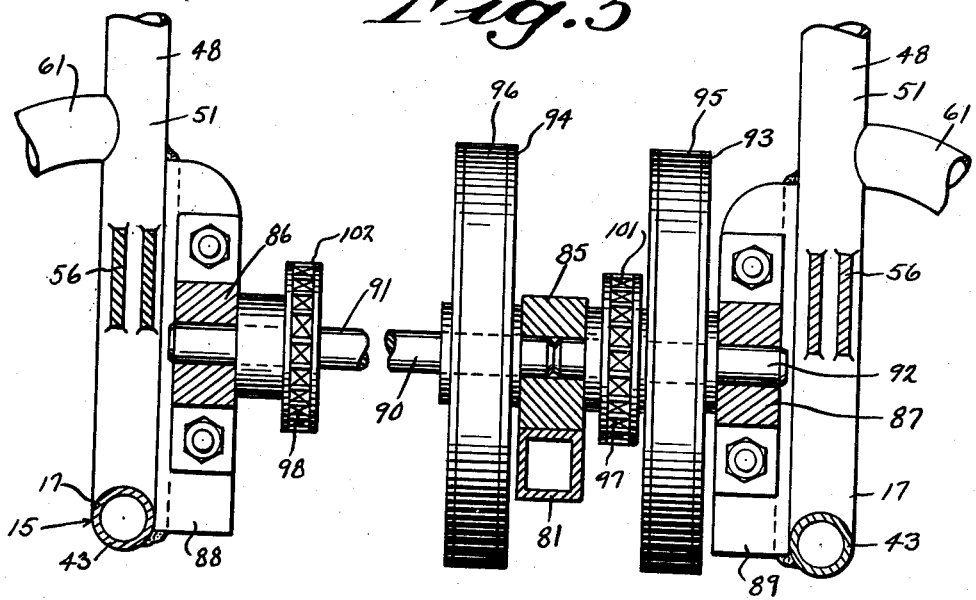

June 22, 1965　　　　E. C. JUNGE　　　3,190,676
SCOOTER TYPE VEHICLE
Filed Sept. 29, 1961　　　　　　　　　　5 Sheets-Sheet 4
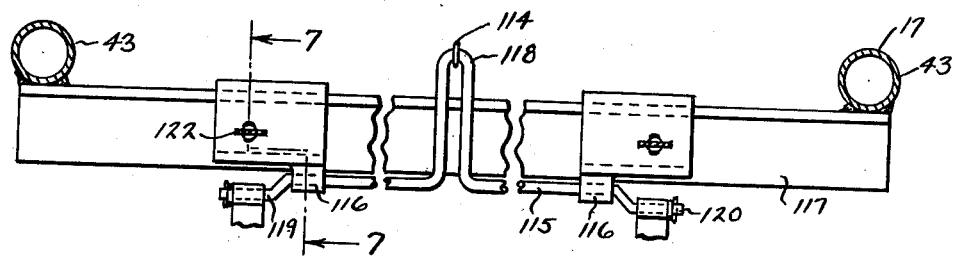
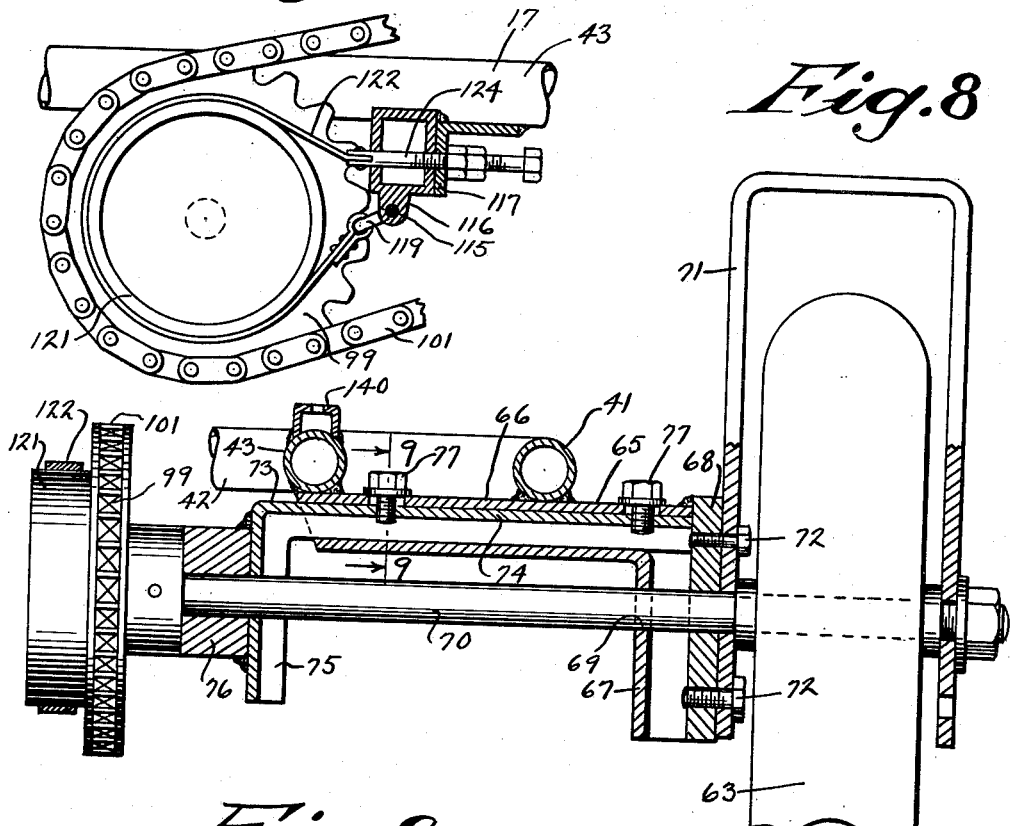
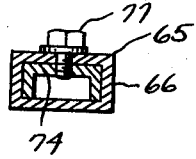
INVENTOR
EDWARD C. JUNGE
BY
*Wright & Wright*
ATTORNEYS June 22, 1965     E. C. JUNGE     3,190,676
SCOOTER TYPE VEHICLE
Filed Sept. 29, 1961     5 Sheets-Sheet 5
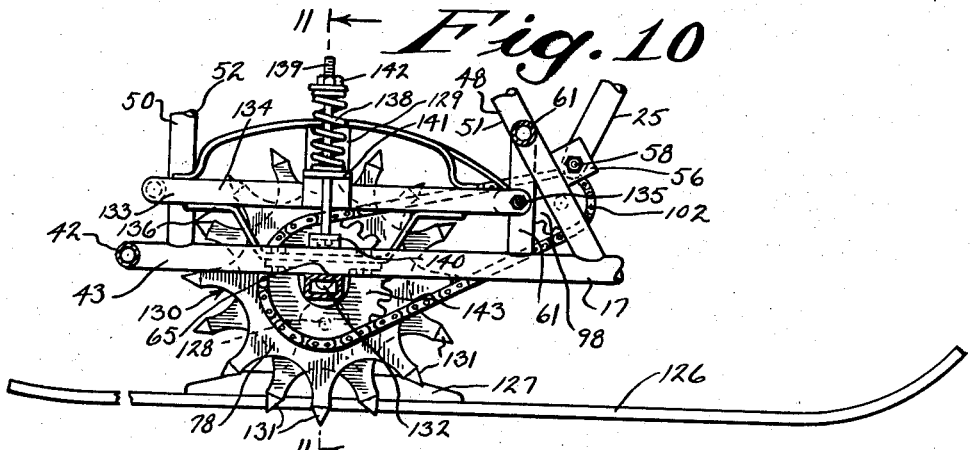
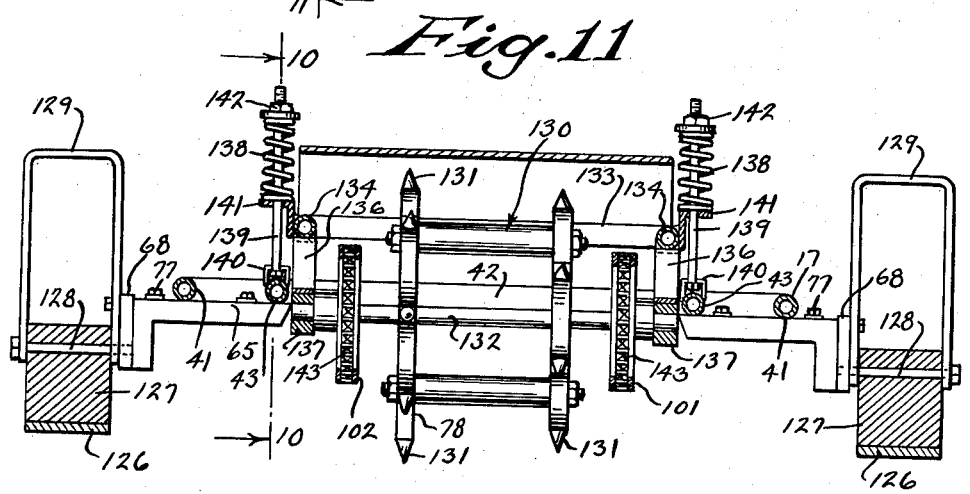
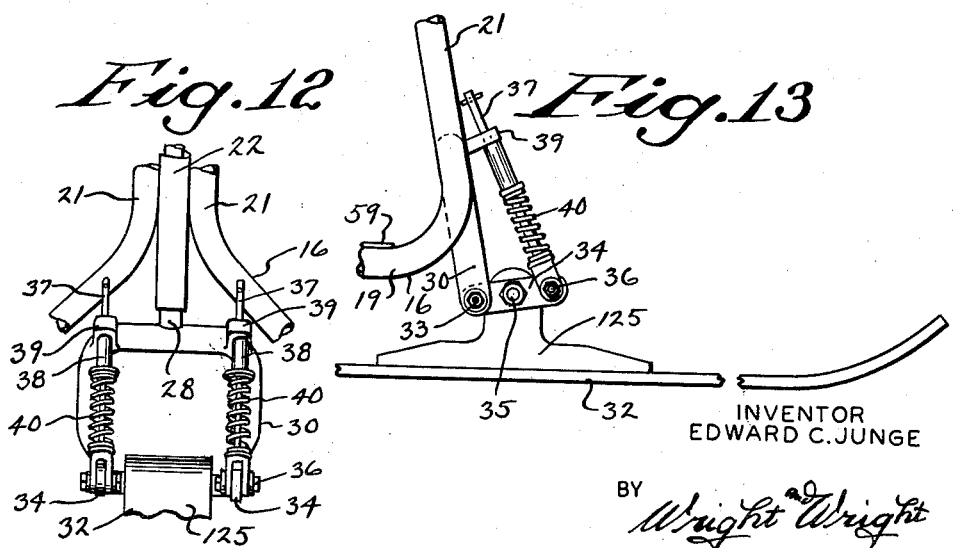
INVENTOR
EDWARD C. JUNGE
BY Wright and Wright
ATTORNEYS

United States Patent Office 3,190,676
Patented June 22, 1965

3,190,676
SCOOTER TYPE VEHICLE
Edward C. Junge, 1318 Williamson St., Madison, Wis.
Filed Sept. 29, 1961, Ser. No. 141,885
1 Claim. (Cl. 280—273)

This invention appertains to a light weight all purpose motor vehicle embodying interchangeable wheels and sleigh runners, whereby the vehicle can be effectively used for travel over clear highways and terrain during warm seasons of the year and over snow and ice during the cold seasons.

One of the primary objects of my invention is to provide an inexpensive, easily maneuverable vehicle in the nature of a scooter and capable of use for running errands or as a motorized golf cart or as a pulling vehicle for small garden implements, such as lawn mowers, and the like.

Another salient object of my invention is the provision of a two seat motor scooter of the three-wheeled type having a strong and durable frame for effectively supporting the engine, driving mechanism and the seats, the structure for the seats constituting a part of, and means for bracing and reinforcing the frame.

A further important object of my invention is the provision of means whereby the scooter can be easily converted from a wheeled vehicle to a sleigh and vice versa, the construction being such that a spiked propeller drum can be easily and quickly associated with the frame and driving mechanism, whereby the vehicle can be effectively propelled over ice and snow.

Another further important object of my invention is the provision of novel means for mounting the propelling drum onto the frame, whereby the drum will be spring-urged toward the ground so as to insure proper driving engagement of the drum with the snow or ice.

A still further important object of my invention is the provision of means whereby the vehicle can be quickly and easily partially dismantled or taken apart, so that the same can be transported in the trunk of an automobile from one place to another.

With these and other objects in view, the invention consists in the novel construction, arrangement and formation of parts, as will be hereinafter more particularly described and claimed and illustrated in the accompanying drawings, in which drawings, FIGURE 1 is a vertical longitudinal sectional view through my improved motor scooter taken on the line 1—1 of FIGURE 2, looking in the direction of the arrows;

FIGURE 2 is a horizontal sectional view through the figure taken on the line 2—2 of FIGURE 1, looking in the direction of the arrows;

FIGURE 3 is a fragmentary detail transverse sectional view taken on the line 3—3 of FIGURE 1, looking in the direction of the arrows, and illustrating the simple and novel means for tightening and loosening the belts of the driving mechanism to bring about a desired driving connection between the engine and rear wheels or propelling drum of the vehicle, as the same may be;

FIGURE 4 is a detail fragmentary vertical sectional view taken at right angles to FIGURE 3 and on the line 4—4 of FIGURE 3, looking in the direction of the arrows;

FIGURE 5 is a fragmentary transverse sectional view through the vehicle taken on the line 5—5 of FIGURE 1, looking in the direction of the arrows and illustrating a part of the driving mechanism of the vehicle;

FIGURE 6 is a fragmentary transverse sectional view through the vehicle taken on the line 6—6 of FIGURE 1, looking in the direction of the arrows illustrating a portion of the braking mechanism for the rear wheels of the vehicle;

FIGURE 7 is a detail fragmentary longitudinal sectional view through the vehicle taken on the line 7—7 of FIGURE 6, looking in the direction of the arrows, the view illustrating a part of the driving mechanism for a rear wheel and the brake therefor;

FIGURE 8 is a detail fragmentary transverse sectional view through the rear end of the vehicle taken on the line 8—8 of FIGURE 1, looking in the direction of the arrows, the view illustrating the means of connecting a rear wheel with the frame and a part of the drive for a rear wheel of the frame;

FIGURE 9 is a detail fragmentary sectional view through a portion of the frame, the view being taken on the line 9—9 of FIGURE 8, looking in the direction of the arrows, the view illustrating more particularly the means for detachably connecting the wheel bolster or support with the frame of the vehicle;

FIGURE 10 is a fragmentary longitudinal sectional view through the vehicle taken on the line 10—10 of FIGURE 11 looking in the direction of the arrows, the view illustrating more particularly the association of the sleigh runners and propelling mechanism for the vehicle over snow and ice, with the wheels of the vehicle and supports therefor being removed;

FIGURE 11 is a transverse sectional view through the vehicle showing the sleigh runners and propelling means for the vehicle over snow and ice, the section being taken on the line 11—11 of FIGURE 10, looking in the direction of the arrows;

FIGURE 12 is a fragmentary front elevational view of the vehicle showing the front sleigh runner attached thereto in lieu of the front wheel, and FIGURE 13 is a fragmentary side elevational view of the front end of the vehicle and showing a sleigh runner attached thereto in lieu of the front wheel.

Figure 1:
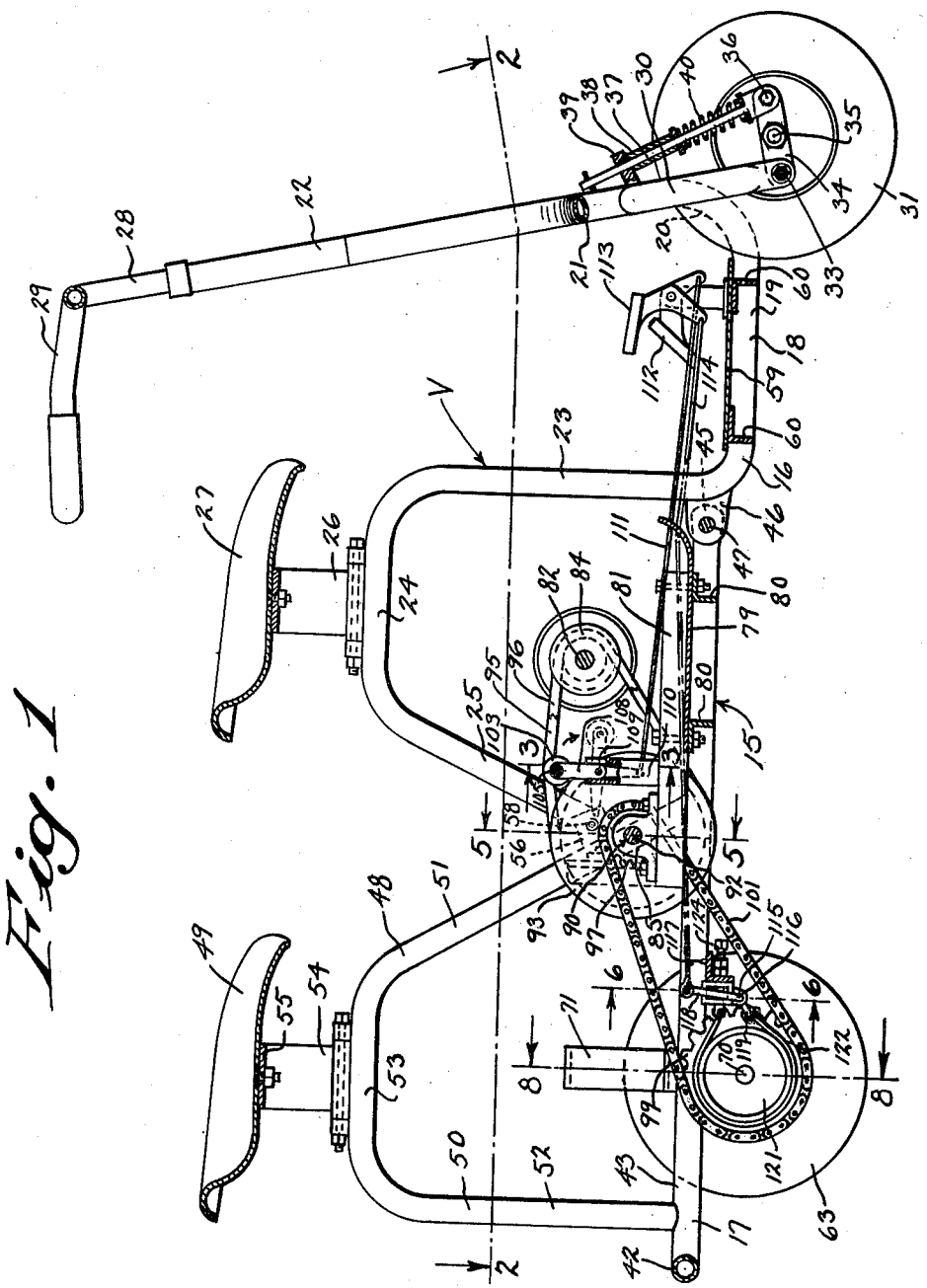

Referring to the drawings in detail, wherein similar reference characters designate corresponding parts throughout the several views, the letter V generally indicates my novel motor vehicle and the same includes a main frame 15 for supporting the various parts of the vehicle.

The frame 15 includes a main front section 16 and a rear section 17. The front section 16 is preferably formed from metal tubing and includes a U-shaped bottom section 18 having parallel spaced apart side rails 19 and a connecting front rail 20. The front rail 20 has its central portion bent upwardly and forwardly, as at 21, and this bent up portion has rigidly welded or otherwise secured thereto a column 22 for a purpose, which will later more fully appear.

The rear ends of the parallel side rails 19 have formed integral therewith upstanding side posts 23 and the upper ends of the posts are bent rearwardly to form horizontal stretches 24. The horizontal stretches have formed thereon depending rearwardly inclined posts 25. The parallel stretches 24 carry a cross plate 26 and this plate, in turn, supports a bucket type rider's front seat 27.

Referring back to the column 22, the same rotatably carries the steering shaft 28 and the upper end of the shaft is provided with the steering handle bars 29. The lower end of the shaft carries the steering fork 30 and this fork carries either the front steering wheel 31 or the front steering sleigh runner 32 (see FIG. 13), as the case may be. Considering for the moment that the vehicle is provided with wheels, it can be seen that the front wheel 31 is disposed between the arms of the fork and the lower ends of these arms carry a front cross-shaft 33 on which is rockably mounted forwardly extending links 34. These links 34 support intermediate their ends the axle 35 for the front steering wheel 31. In order to bring about a shock absorbing, cushioning effect for the wheel, the forward ends of the links 34 have pivotally secured thereto, as at 36, upwardly extending slide rods 37. These rods slidably extend through the bearing sleeves 38 and bearing ears 39 carried by the arms of the fork 30. Coiled about the rods 37 are expansion springs 40 and the springs bear down on the outer ends of the links 34 and push up against the bearing sleeves 38. Obviously, if the wheel 31 rides over uneven ground, the wheel will be pushed up and down and swing the links 34 up against the downward thrust of the springs 40.

The rear section 17 of the main frame 15 is also of a U-shape in top plan and is also preferably formed from tubular stock. Hence, the rear frame section 17 includes spaced apart parallel side frame bars 41 and a rear connecting end bar 42. As best shown in FIGURE 2, the rear frame section 17 is of a greater width than the front frame section 16 and consequently, the side bars 41 extend beyond the sides of said front frame section 16. In order to thoroughly brace the rear frame section 17, this section also includes inner spaced parallel frame bars 43 which extend longitudinally of the rear section 17. The rear terminals of the inner frame bars 43 are welded, or otherwise fastened, to the end bar 42 and the front terminals of the inner frame bars 43 extend forwardly of the main side bars 41 and the forward terminals of the main side bars 41 are curved inwardly, as at 44, toward the inner frame bars 43 and these curved terminals are welded, or otherwise secured, to the inner bars 43. The extreme forward ends of the inner frame bars 43 are flattened to provide pivot ears 45 and these ears 45 are received between bracket lugs 46 rigidly welded to the upright posts 23 of the front frame section 16. Bolts 47 connect the pivot ears 45 with the bracket lugs 46. The inner frame bars 43 carry a frame 48 for a rear seat 49. The rear seat frame 48 includes like inverted U-shaped frame members 50. Each of the side frame members 50 includes depending front and rear legs 51 and 52, and a horizontally extending connecting stretch 53. The front legs 51 are inclined forwardly and the lower terminals of the legs 51 and 52 are welded, or otherwise rigidly secured, to the inner frame bars 43. The horizontal stretches 53 of the side frames 50 are connected by a plate 54 and this plate carries the bracket 55 for the rear seat 49. The front legs 51 of the side frames carry forwardly extending lugs 56 and the rear legs or posts 25 of the front frame section 16 have their lower ends flattened to provide ears 57. These ears 57 are received between the bracket lugs 56 and bolts 58 are employed for connecting the ears 57 with the bracket lugs 56. It is to be noted at this time, that the front frame section 16 can be readily disconnected from the rear frame section 17 by merely removing the bolts 47 and 58. The side rails 41 of the rear frame section 17 constitute guards and rests for the feet of the person seated on the rear seat 49. A guard plate and foot rest 59 can be provided for the person occupying the front seat 27 and this plate extends across the front frame section 16 and can be welded or otherwise secured to the side rails 19 and this plate also forms a reinforcement for the front frame section 16 and its rails 19. As best shown in FIGURE 1, the side rails 19 can also be braced by transversely extending angle bars 60. The guard and foot rest plate 59 also forms a support for certain adjuncts of the vehicle, as also will be later set forth.

Referring back to the rear frame section 17, the same can be also braced at different points, should such be desired, and as best shown in FIGURE 2, short tubular braces 61 can be employed for connecting the intermediate portions of the outer side rails 41 and the front legs 51. It is preferred to have the rear section 17 thoroughly braced in that this section not only carries the rear passenger seat 49 but also carries the weight of the motor 62 employed for driving the vehicle as will be later set forth.

As heretofore brought out, the vehicle can either be associated with wheels or sleigh runners and again considering that the vehicle is equipped with wheels, then rear wheels 63 and 64 are provided and these wheels are associated with the rear frame section 17 in a novel manner, and these wheels extend well beyond the side rails 41 of the rear frame section 17. Laterally extending side bolsters 65 are provided for detachably supporting wheels or sleigh runners, as the case may be, and these bolsters are of a hollow construction and are of a substantially rectangular shape in cross-section, as best shown in FIGURE 9. These bolsters are welded, or otherwise rigidly and firmly secured, to the side rails 41 and the inner longitudinal bars 43. The bolsters 65 extend transversely of the vehicle and terminate short of the longitudinal center of the vehicle and each bolster is of a right-angular shape in side elevation and thus includes a horizontal portion 66 and a depending leg 67. The legs 67 can have welded or otherwise rigidly fastened thereto relatively heavy attaching plates 68. The plates 68 and the inner walls of the legs 67 have formed therein bearing openings 69 and these openings rotatably support stub axle shafts 70. The wheels 63 and 64 are keyed, or otherwise secured, to these stub axles and if desired the wheels can be provided with inverted U-shaped guards 71 which are bolted, as at 72, to the reinforcing plates 68. Slidably mounted in each of the horizontal portions 66 of the bolsters 65 are wheel and axle supporting brackets 73. These brackets are of a U-shape in cross-section and of a right-angular shape in side elevation. Thus each wheel bracket 73 includes a horizontal portion 74 and a depending vertical bearing portion 75. The depending bearing portions 75 of the wheel brackets 73 have rigidly secured thereto additional bearing blocks 76 for receiving the inner ends of the stub axles 70. In assembling the rear wheel structure, the horizontal portions 74 of the wheel brackets 73 are slipped into the horizontal portion 66 of the bolsters 65 and are held therein against accidental displacement by screws 77 which extend through large openings in the bolsters and in threaded openings in the wheel brackets.

Novel means of a flexible type is provided for driving the rear axles 70 from the internal combustion engine 62 and the driving means is such that the same can be modified to permit the effective rotation of a propelling reel or drum 78 when the vehicle is being used as a sled. The engine 62 is of a small light weight character and of a type well known in the trade. The motor is mounted on a platform 79 which can be in the nature of a sheet metal plate and this platform is rigidly secured to the inner bars 43. The bars 43 at this point can be further braced by transversely extending angle bars 80. The platform 79 can be secured to these angle bars, as best shown in FIGURE 1. The platform at one side can have firmly bolted or otherwise secured thereto a longitudinally extending supporting bar 81, the purpose of which will later appear. The motor 62 includes a drive or crankshaft 82 and this shaft extends transversely of the frame and has keyed or otherwise secured thereto drive pulley wheels 83 and 84. The rear end of the frame bar 81 has rigidly bolted thereto a bearing block 85 and this block is in transverse alignment with similar side bearing blocks 86 and 87. The bearing blocks 86 and 87 are in turn rigidly mounted on supporting plates 88 and 89 welded or otherwise rigidly fastened to the front inclined legs 51 of the side seat frames 48. The bearing blocks 85, 86 and 87 rotatably support a split driven shaft 90 and this split shaft includes independent drive sections 91 and 92. The inner ends of the sections 91 and 92 are carried by the bearing block 85. The shaft sections 91 and 92 have keyed or otherwise secured thereto pulley wheels 93 and 94 of a desired diameter. A pulley belt 95 is employed for operatively connecting the pulley wheels 83 and 93 together and a pulley belt 96 is employed for operatively connecting the pulley wheels 84 and 94 together. Keyed to the shaft section 91 is a sprocket wheel 97 and keyed to the shaft section 92 is a similar sprocket wheel 98. The drive axles 70 have keyed or otherwise secured thereto adjacent to their inner ends sprocket wheels 99 and 100. A sprocket chain 101 operatively connects the sprocket wheels 97 and 99 together. A similar sprocket chain 102 operatively connects the sprocket wheels 98 and 100 together. Thus, it can be seen that the drive axles 70 are driven independently of one another. This is for the purpose of facilitating the making of turns with the vehicle.

Normally, the pulley belts 95 and 96 are loose on their pulley wheels and means is provided for bringing about the tightening of the belts by the operator of the vehicle to insure a positive drive when needed. This tightening means includes spools 103 and 104 provided respectively for the belts 95 and 96. These spools are mounted on a shaft 105 carried by a bearing sleeve 106 rigidly secured to a crank arm 107 and a supporting arm 108. These arms 107 and 108 are rockably mounted on a supporting bolt or the like 109. The bolt is in turn carried by an upstanding post 110 mounted on the frame bar 81. The spools 103 and 104 engage their respective belts between the pulleys 83 and 93 and the pulleys 84 and 94. As best shown in FIGURES 3 and 4, the crank arm 107 is rotatably mounted on the bolt 109 intermediate its ends and the lower end of the crank arm has connected thereto a pull cable 111. This pull cable 111 leads to an operating foot pedal 112 rockably mounted on the foot rest plate and guard 59. By pressing down on the pedal 112 the spools 103 and 104 can be moved to a raised, elevated position for lifting up on the upper runs of the belts 95 and 96 so as to bring about the tightening of the belts and the positive drive between the engine crankshaft and shaft driven sections 91 and 92. When the spools 103 and 104 are in their lowered position and the belts are loose, the belts can slip on their pulley wheels so that forward driving of the vehicle can be stopped.

Disposed adjacent to the belt tightening pedal 112 is a brake pedal 113 and this pedal has connected thereto a pull cable 114 and the pull cable operates a brake mechanism. This brake mechanism includes a rock shaft 115 mounted in suitable bearings 116 carried by a cross frame bar 117 which can be welded or otherwise fastened to the inner main frame bars 43. The rock shaft 115 is provided with a crank arm 118 and the pull cable 114 is connected to this crank arm. The ends of the rock shaft 115 also terminate in crank arms 119 and 120. Now referring again to the drive axles 70 (see FIG. 8), the inner ends thereof adjacent to the sprocket wheels 99 and 100 have rigidly fastened thereto brake drums 121. These brake drums are engaged respectively by brake bands 122 and 123. The lower terminals of the brake bands are secured to the crank arms 119 and 120. The upper ends of the brake bands are secured to adjusting bolts 124. These bolts 124 are carried by the transversely extending frame bar 117 and by adjusting the bolts 124 the brake bands can be tightened or loosened, as occasions demand. Obviously, by pressing down on the brake pedal 113, the shaft 115 can be rocked for the instant tightening of the brake bands around their drums to bring about stopping of the vehicle.

It can be seen from the foregoing that a light portable vehicle in the nature of a scooter has been provided and that the same can carry two persons. The person on the rear seat 49 can grasp the upper ends of the side frame seat bars 48 to facilitate his riding comfort. It also can be seen that the nature of the vehicle is such that the front and rear frame sections 16 and 17 can be easily taken apart to facilitate shipping, storing, etc., and obviously, the wheels and steering gear can also be removed.

The vehicle is of a versatile nature and can be used as a golf cart or a machine for running short errands or as means for pulling lawn implements. As also brought out, the machine can be easily converted into a snow or ice vehicle and this will now be more particularly described.

Thus the front wheel 31 is detached from the links or levers 34 by removing the bolt 35 and substituting therefor the sleigh runner 32. This runner is provided with a knee 125. The knee is pivotally united to the links or levers 34 by means of the bolt 35. The rear wheels 63 and 64 are now removed with their axles 70 from the frame and this is brought about by removing the bolts 72, then taking the guards 71 off the axles with the wheels 63 and 64. The brake bands 122 and 123 and the sprocket chains 101 and 102 are removed. The headed screws 77 are now removed and the axles 70 with their frame members 73 are pulled out of the bolsters 65. Rear side sleigh runners 126 are now brought into play and these runners are provided with knees 127. The knees are rockably mounted on shafts or bolts 128 which are rigidly fastened to the frame plates 68. Guards 129 can also be carried by the shafts or bolts 128.

Novel means 130 is provided for driving the vehicle over snow and ice and this driving means includes the reel or drum 78 carrying spikes 131. This reel is rigidly secured to a driven shaft 132 and this driven shaft is carried in a novel manner by a supplemental frame 133. The frame 133 is disposed between the inner frame bars 43 and includes side parallel frame bars 134. The forward ends of these frame bars 134 are pivotally secured to the brace members 61 of the main rear frame 17 by pivot bolts 135. Thus the supporting frame for the drive reel or drum 78 is mounted for swinging movement toward or away from the ground. The supporting frame 133 for the drive carries depending brackets 136 and these brackets in turn carry bearings 137 for the propelling reel or drum 132. The frame and consequently the propelling reel or drum is normally urged toward the ground by expansion springs 138 which are coiled about rods 139. The lower ends of the rods are mounted in clips 140 secured to the inner frame bars 43 and the rods slidably extend through guides 141 carried by the supporting frame 133. The springs are confined on the rods 139 between the guides 141 and adjustable nuts 142 threaded on the rods. The shaft 132 has keyed or otherwise secured thereto sprocket wheels 143 and the sprocket chains 101 and 102 are trained about the sprocket wheels 143.

From the foregoing description, it can be seen that I have provided an all purpose vehicle which can be quickly changed from a wheeled vehicle to a vehicle which can be effectively used over snow and ice.

The vehicle can be provided with numerous adjuncts, and safety features, if such should be desired, such as a windshield carried by the front handle bars 29 and a utility box or basket. The utility box or basket can be associated with the rear end of the frame.

Changes in details may be made without departing from the spirit or the scope of this invention, but what is claimed as new is:

An all purpose vehicle of the scooter type comprising a main frame including a front section and a rear section, said front section including side frame bars having upturned front terminals and inverted U-shaped rear terminals, a drive's seat supported by the inverted U-shaped rear terminals, a steering post carried by the upturned front terminals, ground engaging means carried by the steering post, said rear frame section including parallel side bars and upstanding inverted U-shaped side seat frame bars, a seat carried by said seat frame bars, ground engaging means carried by the opposite sides of the rear frame section, and means rigidly securing the front frame section and rear frame section together at two spaced points.

References Cited by the Examiner

UNITED STATES PATENTS

| | | | |
|---|---|---|---|
| D. 171,318 | 1/54 | Wegele. | |
| 1,250,739 | 12/17 | Wells | 180—6 |
| 1,268,229 | 4/18 | Frank | 280—7.14 |
| 1,281,980 | 10/18 | Kostewich | 280—7.14 |
| 1,293,958 | 2/19 | Smedshammer | 180—6 |
| 1,296,531 | 3/19 | Landby | 180—6 |
| 1,309,305 | 7/19 | Scheiner | 180—27 |
| 1,428,907 | 9/22 | Reigh | 180—27 |
| 1,459,371 | 6/23 | Kelly | 280—7.12 X |
| 2,445,058 | 7/48 | Fields. | |
| 2,817,406 | 12/57 | Brewer | 180—27 X |
| 2,978,251 | 4/61 | Gerdes | 280—7.14 X |

FOREIGN PATENTS

| | | |
|---|---|---|
| 27,340 | 3/21 | Denmark. |
| 1,064,076 | 12/53 | France. |

A. HARRY LEVY, *Primary Examiner*.

LEO FRIAGLIA, *Examiner*.